May 23, 1933.  O. KELLY  1,910,019
FLUID PRESSURE MOTOR
Filed Sept. 18, 1929  3 Sheets-Sheet 2
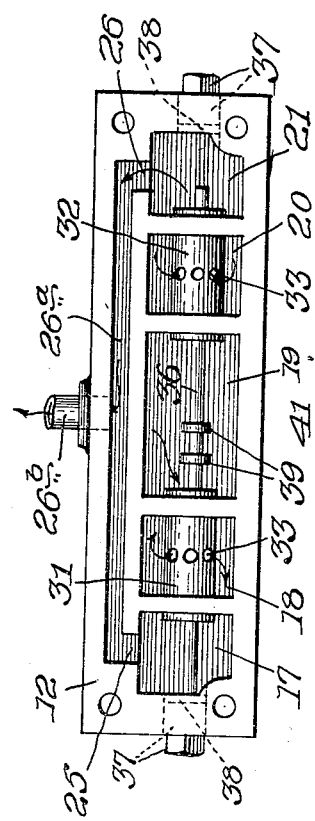
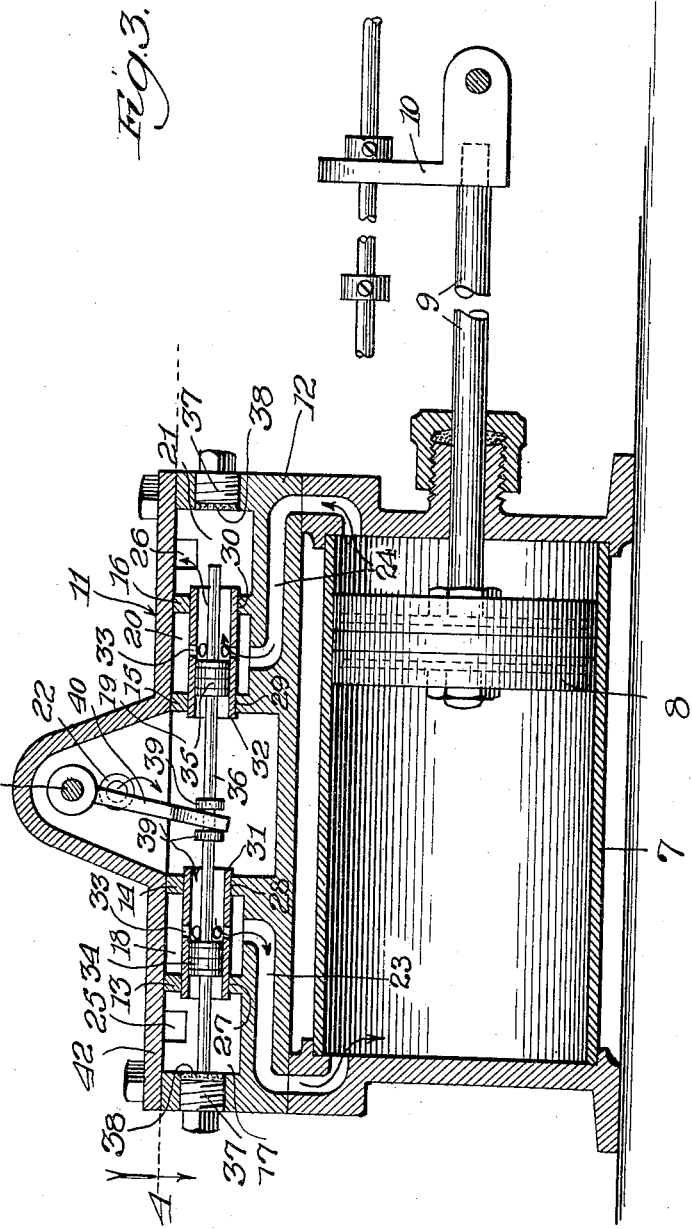
Inventor
Orin Kelly,
By Dyrenforth, Lee, Chritton & Wiles,
Attys.

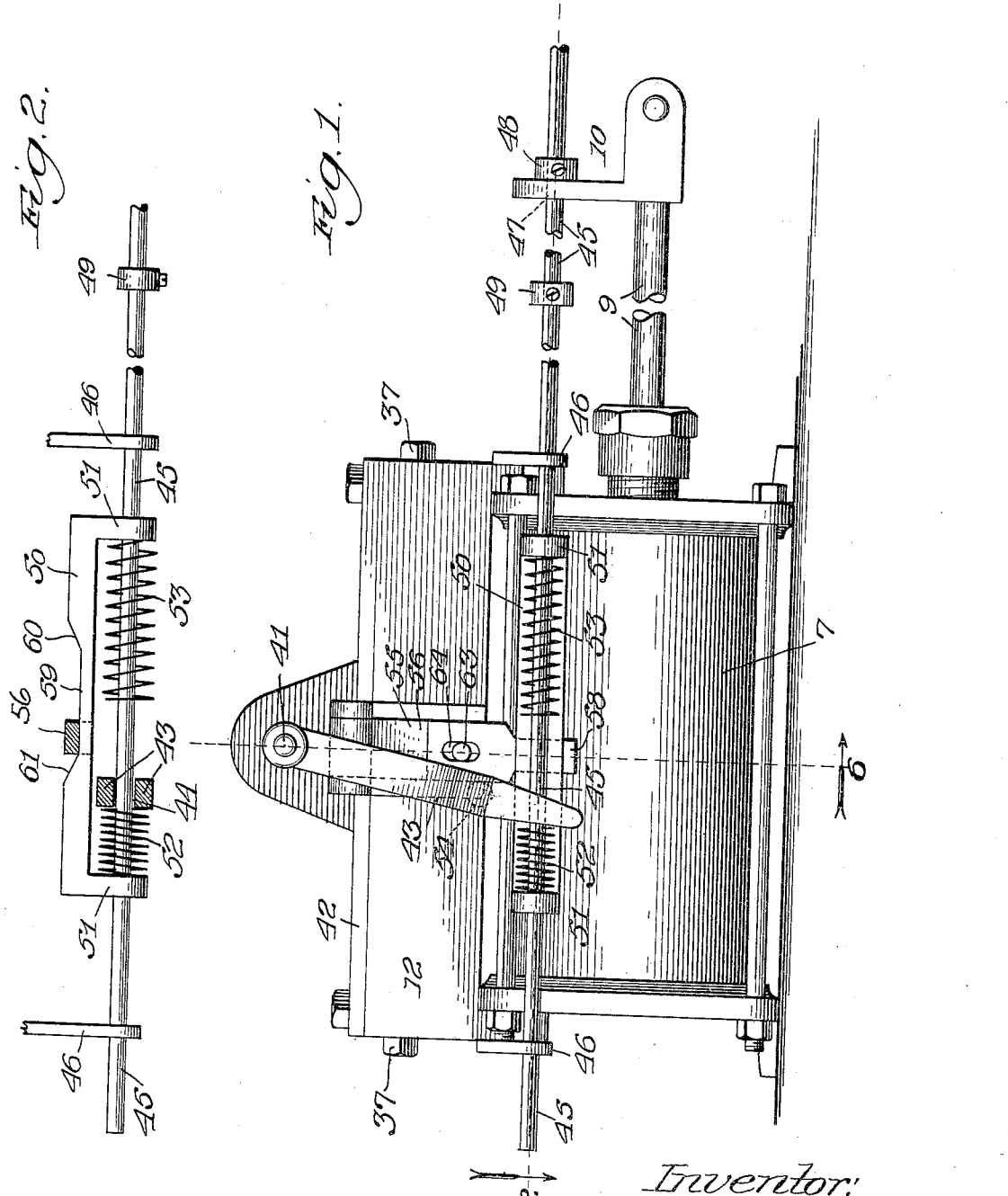

May 23, 1933.  O. KELLY  1,910,019
FLUID PRESSURE MOTOR
Filed Sept. 18, 1929   3 Sheets-Sheet 3
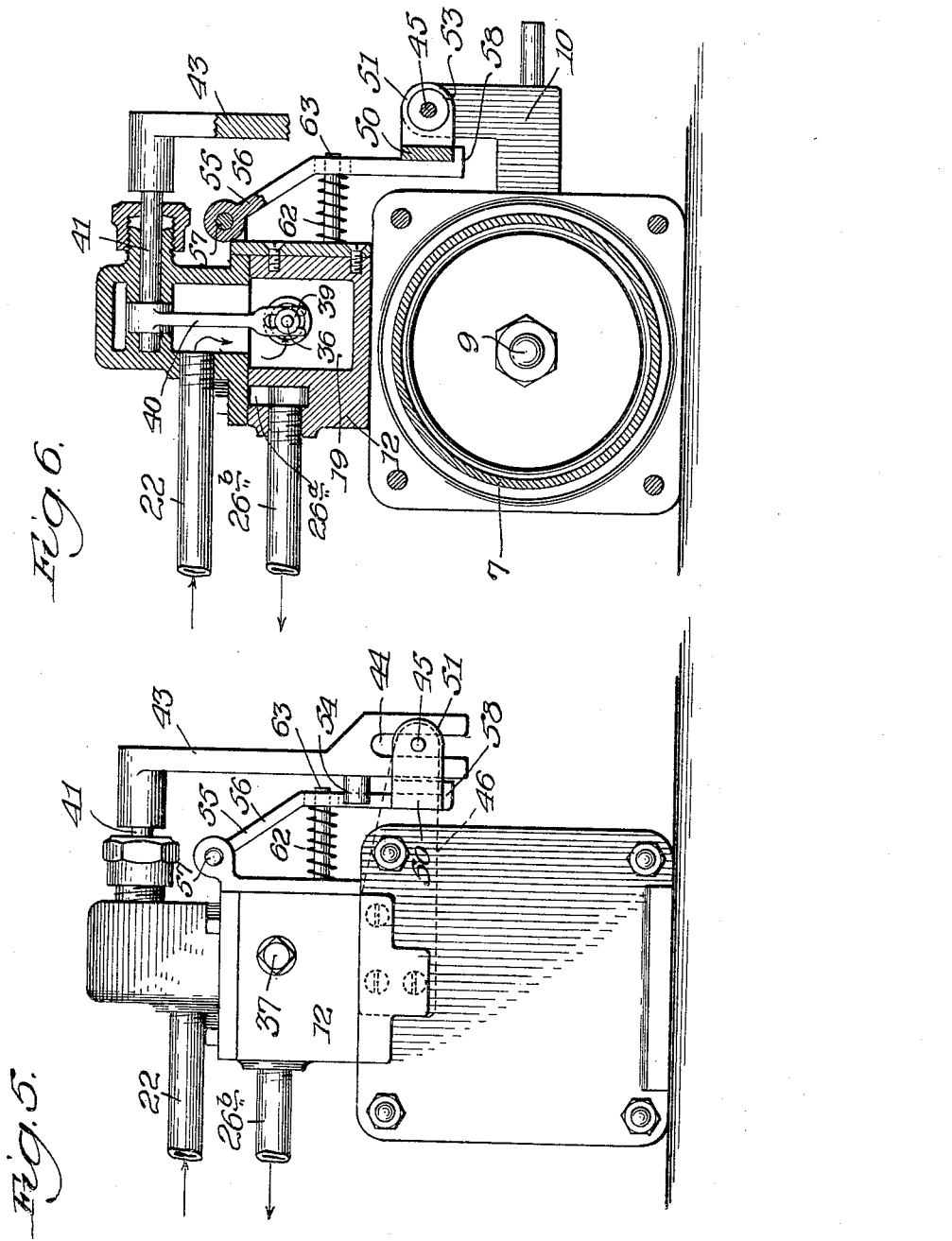

Patented May 23, 1933

1,910,019

UNITED STATES PATENT OFFICE

ORIN KELLY, OF COLUMBUS, OHIO

FLUID-PRESSURE MOTOR

Application filed September 18, 1929. Serial No. 393,484.

My invention relates, more particularly, to motors employing liquid, such as water, under pressure as the fluid for actuating them.

One of my objects is to provide a motor of the character above stated which will operate at low speed and regardless of the reduction or increase, suddenly or otherwise, of the pressure of the actuating fluid.

Another object is to provide a construction of such kind of motor whereby, should the pressure of the actuating fluid become reduced to a degree below that necessary for actuating it and the motor stops, the motor will automatically restart upon the raising of the pressure of the actuating fluid.

Another object is to provide in such a motor for the insuring against leakage around the valves and piston; and other objects as will be manifest from the following description.

Referring to the accompanying drawings:—

Figure 1 is a view in side elevation of a fluid-pressure motor embodying my invention.

Figure 2 is a section taken at the line 2 on Fig. 1 and viewed in the direction of the arrow.

Figure 3 is a view in longitudinal vertical section of the motor.

Figure 4 is a plan view of the valve casing forming a part of the motor, this view being taken at the line 4 on Fig. 3 and viewed in the direction of the arrow, the cover of the valve casing being removed.

Figure 5 is an end view of the mechanism of Fig. 1, the view being taken from the left-hand side of this figure; and Figure 6, a section taken at the line 6 on Fig. 1 and viewed in the direction of the arrow.

The motor shown comprises a cylinder 7 containing a piston 8 connected with a piston rod 9 provided with a head 10 at which it is adapted for connection with the device to be operated by the motor.

The mechanism shown is adapted to automatically reciprocate the piston 8 in opposite directions and to this end is provided with valve mechanism represented generally at 11, which operates, in response to the movements of the piston 8, to introduce the actuating fluid into opposite ends, alternately, of the cylinder 7 and exhaust the spent fluid therefrom.

The valve mechanism 11 comprises a casing 12 shown as extending along one side of the cylinder 7 and containing partitions 13, 14, 15 and 16 which divide the space within the valve casing 12 into aligning compartments 17, 18, 19, 20 and 21. The compartment 19 is in communication with a pipe 22 which leads from any suitable source (not shown) of fluid under pressure by which the motor is actuated.

The compartments 18 and 20, located at opposite sides of the compartment 19, communicate, through ports 23 and 24, respectively, with the opposite ends of the cylinder 7; and the compartments 17 and 21, which constitute exhaust compartments, contain exhaust ports 25 and 26, respectively, which open into an exhaust passage 26ᵃ connecting with an exhaust pipe 26ᵇ.

The partitions 13, 14, 15 and 16 contain aligning openings 27, 28, 29 and 30, respectively, and fitted closely in these openings are tubes 31 and 32, each of which opens at one end into the compartment 19; these tubes at their other ends opening into the compartments 17 and 21, respectively.

Each tube 31 and 32 between its ends contains a circumferential series of openings 33, the openings 33 in the tube 31 communicating with the compartment 18 and the openings 33 in the tube 32 communicating with the compartment 20.

Slidable in the tubes 31 and 32, from one side to the other of the openings 33 therein, are pistons 34 and 35, respectively, rigidly connected with a rod 36 reciprocable with the valve pistons 34 and 35, in the casing, the latter containing, at its ends and in alignment with the rod 36, plugs 37 forming stops for the rod 36, these plugs being preferably provided at their inner ends with fibre sections 38 to prevent distortion of the ends of the rods and minimize noise in the operation of the mechanism.

The rod 36 is provided, at the portion thereof which extends into the compartment 19, with spaced apart stop-forming collars 39 between which an arm 40, fixed on a shaft 41 journaled in the top 42 of the casing 12, extends, the lower end of the arm 40 being of yoke-shape and straddling the rod 36.

The outer end of the shaft 41 is provided with a depending arm 43 slotted at its lower end, as indicated at 44, at which portion it straddles a rod 45. The rod 45 is reciprocably supported in ears 46 extending from the valve casing 12 and slidingly extends through an opening 47 in the head 10, tappets 48 and 49 being adjustably mounted on the rod 48 at opposite sides of the head 10.

Rigidly secured to the rod 45 is a yoke-shapped member 50, the rod extending through the arms 51 of this yoke and between which arms the arm 43 is located. Surrounding the rod 45 at opposite sides of the arm 43 and within the space between the arms 51, are coil springs 52 and 53 through the medium of which the arm 43 and consequently the valve device above described is reciprocated back and forth for the purpose above explained.

The arm 43 is provided with a rearwardly extending pin 54 into the path of movement of which a locking device 55, in the form of a trigger, extends. The trigger 55 is shown as formed of a bar-like member 56 pivoted at its upper end, as indicated at 57, to the valve casing 12, its lower end being provided with an extension 58 underlying the yoke 50 and forming a guiding support for the latter. The body portion of the yoke 50 is recessed along its outer side, as represented at 59, the opposite ends of this recess presenting oppositely inclined cam surfaces 60 and 61. The lower end of the member 56 opposes the recess 59 and is yieldingly pressed against the yoke 50 by a coil spring 62 interposed between the member 56 and the valve casing 12 and surrounding a pin 63 extending outwardly from the casing 12 and through a vertically elongated opening 64 in the member 56.

The operation of the mechanism described is as follows:

Assuming that the parts of the mechanism are in the position shown in the drawings, the actuating fluid entering the compartment 19 flows into the tube 31, thence through the openings 33 therein into the passage 23, entering the left-hand end of the cylinder, the opposite end of this cylinder being open for exhaust through the passage 24, openings 33 in the tube 32, and the exhaust compartment 21.

As the piston 8 nears the limit of its movement to the right in Fig. 3, the head 10 engages the tappet 48 and shifts the rod 45, and with it the yoke 50, to the right. In this position of the parts the arm 56 extends into the recess 59 in the yoke 50 and thus into the path of movement of the pin 54 with the result that the spring 52 becomes highly compressed between the arm 43 and the arm 51 at the left-hand end of the yoke 50. As the rod 45 and yoke 50 continue their movement to the right, the spring 52 becoming further and further compressed during such movement, the cam surface 61 rides against the trigger 56 swinging it rearwardly until it is shifted out of engagement with the pin 54, whereupon the spring 52 is suddenly released and forcibly swings the arm 43 in counter-clockwise direction in Fig. 1, which results in the shifting of the rod 36 to the right in Fig. 3 into a position in which the valve pistons 34 and 35 move to the right in Fig. 3 beyond the openings 33 in the tubes 31 and 32. This movement of the valve mechanism thus reverses the flow of fluid-pressure to the cylinder 7, causing it to enter the right-hand end of this cylinder and conditions the mechanism for the exhaust of the spent actuating fluid from the right-hand end of the cylinder.

As the piston 8 nears the limit of its movement to the left in the drawings, the head 10 engages the tappet 49, shifting the rod 45 and the yoke 50 carried thereby to the left. The arm 43 in this condition of the valve mechanism, inclines downwardly to the right in Fig. 1 and the trigger device 56 by lapping the pin 54 obstructs the swinging of the arm 43 in clockwise direction, whereupon the spring 53 becomes tensioned against the arm 43 as above explained of the spring 52, the storing of energy in the spring 53 increasing until the trigger device is released from the pin by the movement of the cam surface 60 against the arm 56, whereupon the spring 53 is released for forcibly swinging the arm 43 in clockwise direction in Fig. 1 to again reverse the movement of the piston 8.

It will be understood from the foregoing that by providing the valve actuating mechanism shown and above described, the valve is actuated by a snap action and thus there is no danger of the valve mechanism becoming so conditioned that the motor will become stalled. Should the actuating fluid pressure drop suddenly or otherwise, at any stage in the cycle of operations, the restoring of the necessary working pressure of the fluid, will cause the motor to immediately restart and continue its operation.

While I have illustrated and described a particular construction embodying my invention, I do not wish to be understood as intending to limit it thereto, as the same may be variously modified and altered without departing from the spirit of my invention.

What I claim as new, and desire to secure by Letters Patent, is:

1. Valve actuating mechanism for a motor including a shiftable valve and a piston rod, comprising, in combination: a member shiftable by said piston rod; springs carried by said member; a rock lever interposed between and engageable alternately by said springs for shifting said valve; a member pivoted to swing in a plane perpendicular to the plane of movement of the rock lever, said member engageable in one position by said rock lever to prevent movement of the latter during movement of the shiftable member to alternately compress said springs against the rock lever; and means controlled by said piston rod to automatically release said pivoted member from the rock member.

2. Valve actuating mechanism for a motor including a shiftable valve and a piston rod, comprising, in combination: a member shiftable by said piston rod; springs carried by said member; a rock lever interposed between and engageable alternately by said springs for shifting said valve; a member pivoted on an axis perpendicular to the axis of the rock lever and centrally of the path of movement of the latter, said member engageable in one position by said rock lever to prevent movement of the latter during movement of the shiftable member to alternately compress said springs against the rock lever; and means controlled by said piston rod to automatically release said pivoted member from the rock lever.

3. Valve actuating mechanism for a motor including a shiftable valve and a piston rod, comprising, in combination: a valve shifting member oscillating about a pivot; a yoke mounted and arranged to be reciprocated by the piston rod; a pair of compressible springs carried by said yoke and standing at opposite sides of said oscillating member to be alternately compressed thereagainst by such reciprocation; a stop member swingable about a pivotal axis perpendicular to the axis of the first named pivot and substantially centered therewith to inhibit action of the first named member during alternate compression of said springs; means carried by one of said members normally abutting the other member to inhibit movement of the shifting member during alternate compression of said springs; and cam means carried by said yoke to swing said stop member after compression of a spring to free said inhibiting means and cause snap action of the shifting member.

4. Valve actuating mechanism for a motor including a shiftable valve and a piston rod, comprising, in combination: a rock lever for shifting said valve; a reciprocably mounted rod; lost motion connections for driving said rod from the piston rod; a yoke comprising a bar parallel with said rod and lugs projecting from said bar and secured to said rod standing on opposite sides of said rock lever; compressible springs surrounding said rod, abutting said lugs and engageable with opposite sides of said lever; a swingable stop lever spring pressed against said bar and engageable alternately with opposite sides of said rock lever to prevent motion thereof during alternate compression of said springs; and cam means carried by said bar to depress said stop lever to free said rock lever for snap action shifting of the valve.

5. Valve actuating mechanism for a motor including a shiftable valve and a piston rod, comprising, in combination: a rock lever for shifting said valve; a reciprocably mounted rod; lost motion connections for driving said rod from the piston rod; a yoke comprising a bar parallel with said rod and lugs projecting from said bar and secured to said rod standing on opposite sides of said rock lever; compressible springs surrounding said rod, abutting said lugs and engageable with opposite sides of said lever; a swingable stop lever spring pressed against said bar and engageable alternately with opposite sides of said rock lever to prevent motion thereof during alternate compression of said springs; a projection carried by said stop lever, underlying said bar to guide its sliding movement; and cam means carried by said bar to depress said stop lever to free said rock lever for snap action shifting of the valve.

ORIN KELLY.